United States Patent [19]

Fushimi et al.

[11] Patent Number: 6,088,307
[45] Date of Patent: Jul. 11, 2000

[54] WOBBLE SIGNAL DETECTING CIRCUIT, WOBBLE ABNORMALITY DETECTING CIRCUIT, INFORMATION PROCESSING APPARATUS USING THESE CIRCUITS AND METHOD AND RECORDING MEDIUM USED IN THE APPARATUS OR METHOD

[75] Inventors: Tetsuya Fushimi, Chigasaki; Toshimitsu Kaku, Sagamihara; Tetsuya Ikeda, Fujisawa; Toshiaki Ishibashi, Yokohama; Kazuo Shigematsu, Yoshikawa, all of Japan

[73] Assignee: Hitachi, Ltd., Tokyo, Japan

[21] Appl. No.: 09/040,405

[22] Filed: Mar. 18, 1998

[30] Foreign Application Priority Data

Mar. 19, 1997 [JP] Japan .................................. 9-065902

[51] Int. Cl.[7] ...................................................... G11B 7/00
[52] U.S. Cl. .................................. 369/44.13; 369/44.26; 369/44.28; 369/275.4
[58] Field of Search .................................. 369/47, 48, 49, 369/50, 54, 58, 59, 44.12, 44.26, 44.28, 44.34, 275.3, 275.4, 44.13

[56] References Cited

U.S. PATENT DOCUMENTS

| | | |
|---|---|---|
| 5,508,991 | 4/1996 | Onigata et al. . |
| 5,508,995 | 4/1996 | Moriya et al. . |
| 5,566,141 | 10/1996 | Yamaguchi et al. . |
| 5,615,185 | 3/1997 | Horikiri ................................. 369/44.13 |
| 5,754,506 | 5/1998 | Nagasawa et al. ................... 369/44.26 |
| 5,818,805 | 10/1998 | Kobayashi et al. ........................ 369/59 |
| 5,936,933 | 8/1999 | Miyamoto et al. .............. 369/44.13 X |

FOREIGN PATENT DOCUMENTS

| | | |
|---|---|---|
| 0 325 330 A1 | 7/1989 | European Pat. Off. . |
| 0 347 858 A2 | 12/1989 | European Pat. Off. . |
| 0 740 291 A2 | 10/1996 | European Pat. Off. . |
| 0 752 701 A2 | 1/1997 | European Pat. Off. . |
| 0 757 343 A1 | 2/1997 | European Pat. Off. . |

*Primary Examiner*—Muhammad Edun
*Attorney, Agent, or Firm*—Antonelli, Terry, Stout & Kraus, LLP

[57] ABSTRACT

In a wobble signal detecting circuit provided by the present invention, a wobble signal is converted into binary data before being supplied to a PLL circuit by way of a polarity switching circuit and a clock switching circuit. The PLL circuit outputs a recording/playback timing generation clock signal. The frequency of the recording/playback timing generation clock signal is divided by a frequency dividing circuit before being fed back to the PLL circuit. A difference in phase between the wobble signal and the feedback signal is detected by a phase inversion detecting circuit and, if the difference in phase exceeds a phase difference determined in advance, the phase inversion detecting circuit generates a polarity switching signal for switching the polarity of the wobble signal. The polarity switching signal is used to invert the polarity of the polarity switching circuit.

35 Claims, 9 Drawing Sheets

FIG. 4A

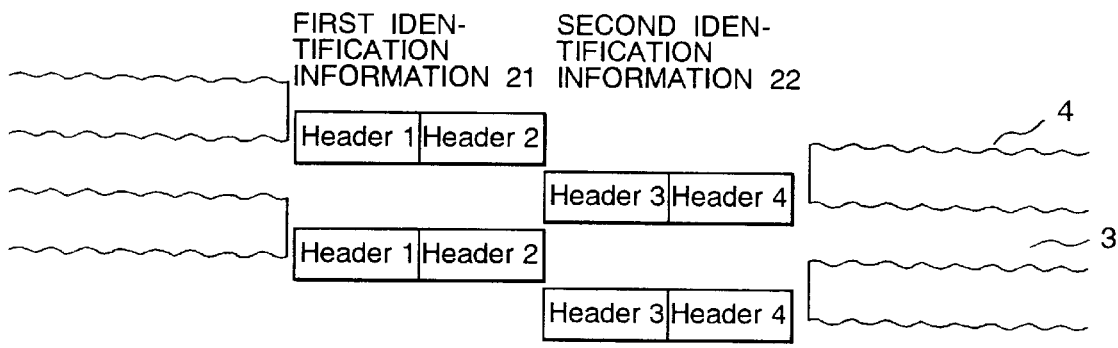

FIG. 4B

| Header 1 | | | | | Header 2 | | | | | Header 3 | | | | | Header 4 | | | | |
|---|---|---|---|---|---|---|---|---|---|---|---|---|---|---|---|---|---|---|---|
| VFO 1 | AM | PID 1 | IED 1 | PA1 | VFO 2 | AM | PID 2 | IED 2 | PA2 | VFO 1 | AM | PID 3 | IED 3 | PA1 | VFO 2 | AM | PID 4 | IED 4 | PA2 |

VFO : 4Tw space-mark REPETITIVE PATTERN   0001000100010001........00010001

FIG. 4C

PID (Physical ID) :

| Sector information | Sector number |
|---|---|

| Reserved | Physical ID # | Sector Type | Layer # |
|---|---|---|---|

Physical ID : 00 ·· Physical ID1
01 ·· Physical ID2
10 ·· Physical ID3
11 ·· Physical ID4

Sector Type : 000 ·· Read only sector
100 ·· RAM first sector
101 ·· RAM last sector
110 ·· RAM before last sector
111 ·· RAM other sector

WOBBLE SIGNAL DETECTING CIRCUIT, WOBBLE ABNORMALITY DETECTING CIRCUIT, INFORMATION PROCESSING APPARATUS USING THESE CIRCUITS AND METHOD AND RECORDING MEDIUM USED IN THE APPARATUS OR METHOD

BACKGROUND OF THE INVENTION

In general, the present invention relates to an information processing technology which is capable of recording and reproducing information with a high degree of reliability. More particularly, the present invention relates to a wobble signal detecting circuit for detecting a wobble signal obtained from a recording medium such as a disk, a wobble abnormality detecting circuit for detecting an abnormality of the wobble signal, an information processing apparatus or method using these wobble signal and wobble abnormality detecting circuits and a recording medium used in the apparatus or method.

As a recording medium used in recording and playback operations, there has been developed a recording medium that is provided with groove tracks as well as land tracks created on a board thereof and infinitesimally wobbling in the radial direction and provided with information recording areas on both the groove and land (inter-groove) tracks. The recording medium has a predetermined wobble pattern. In a recording or playback operation, by using a wobble signal based on this wobble pattern, position information or a position signal is obtained. An operation to record or play back information is based on the position signal.

In the conventional technology, a wobble signal based on a wobble pattern originated from such a recording medium may not be generated normally due to a defect on the recording medium or a control deviation occurring in a playback operation, resulting in a miss which gives rise to a problem that position information or a position signal can not be obtained in a recording or playback operation.

SUMMARY OF THE INVENTION

It is thus an object of the present invention to provide a wobble signal detecting circuit for obtaining a timing generation clock signal from a wobble signal generated from a recording medium and an information processing apparatus using this circuit.

It is another object of the present invention to provide a wobble abnormality detecting circuit for determining whether the recording state of a recording operation is good or bad by using a wobble signal obtained from a recording medium and an information processing apparatus using this circuit.

It is a further object of the present invention to provide an information processing apparatus that offers a high degree of stability, a high degree of reliability and a high density.

The wobble signal detecting circuit provided by the present invention supplies a wobble signal to a PLL circuit by way of a polarity switching circuit and a clock switching circuit after converting the wobble signal into a binary-value signal, letting the PLL circuit generate a recording/playback timing generation clock signal at the output thereof. The frequency of the clock signal is divided by a frequency dividing circuit before the clock signal with a divided frequency is fed back to the PLL circuit. A phase inversion detecting circuit detects a difference in phase between the wobble signal and the feedback signal. When the difference in phase exceeds a predetermined value set in advance, a polarity switching signal for switching the polarity of the wobble signal is generated for inverting the polarity of the polarity switching circuit.

Furthermore, identification information recorded in an identification portion of the recording medium includes an address mark and a sector type. Information on a location at which the identification information is inserted can be detected from the address mark. On the other hand, information on the location of the identification portion and information on the location of a switching portion can be detected from the sector type. It should be noted that the switching portion is used for switching from a groove track to an land track and vice versa.

In another embodiment of the present invention, identification information is detected from an address mark and a sector type is further detected from the identification information. Then, the position of the switching portion is detected from the sector type, allowing another polarity switching signal to be obtained.

In addition, the identification information is monitored for the existence of an error. In the event of an abnormality of the wobble signal, a reference clock signal is supplied to the PLL circuit as a substitute for the wobble signal in order to synchronize an oscillator employed in the PLL circuit with the reference clock signal.

Furthermore, no wobble signal is recorded in the identification portion. In order to suppress variations in oscillation frequency of the oscillator employed in the PLL circuit, the location of an identification portion is detected from an address mark and supplied to the PLL circuit in order to continuously sustain the oscillation of the PLL circuit between identification portions.

Further, according to the present invention, in an operation to record data, from a binary-value signal generated by a comparator, the number of wobble patterns in one sector or the period of a wobble pattern is evaluated. If the evaluation indicates an abnormality due to a defect or the like, the same data can be recorded again.

BRIEF DESCRIPTION OF THE DRAWINGS

Embodiments of the present invention will be described with reference to the following drawings wherein:

FIG. 4A is a model diagram showing identification information used in the present invention in a plain and simple manner;

FIG. 4B is a model diagram showing the contents of each header in identification information used in the present invention;

FIG. 4C is a model diagram showing the contents of physical identification information used in the present invention;

PREFERRED EMBODIMENTS OF THE INVENTION

The present invention will become more apparent from the following detailed description of some preferred embodiments with reference to the accompanying diagrams.

Figure 1:
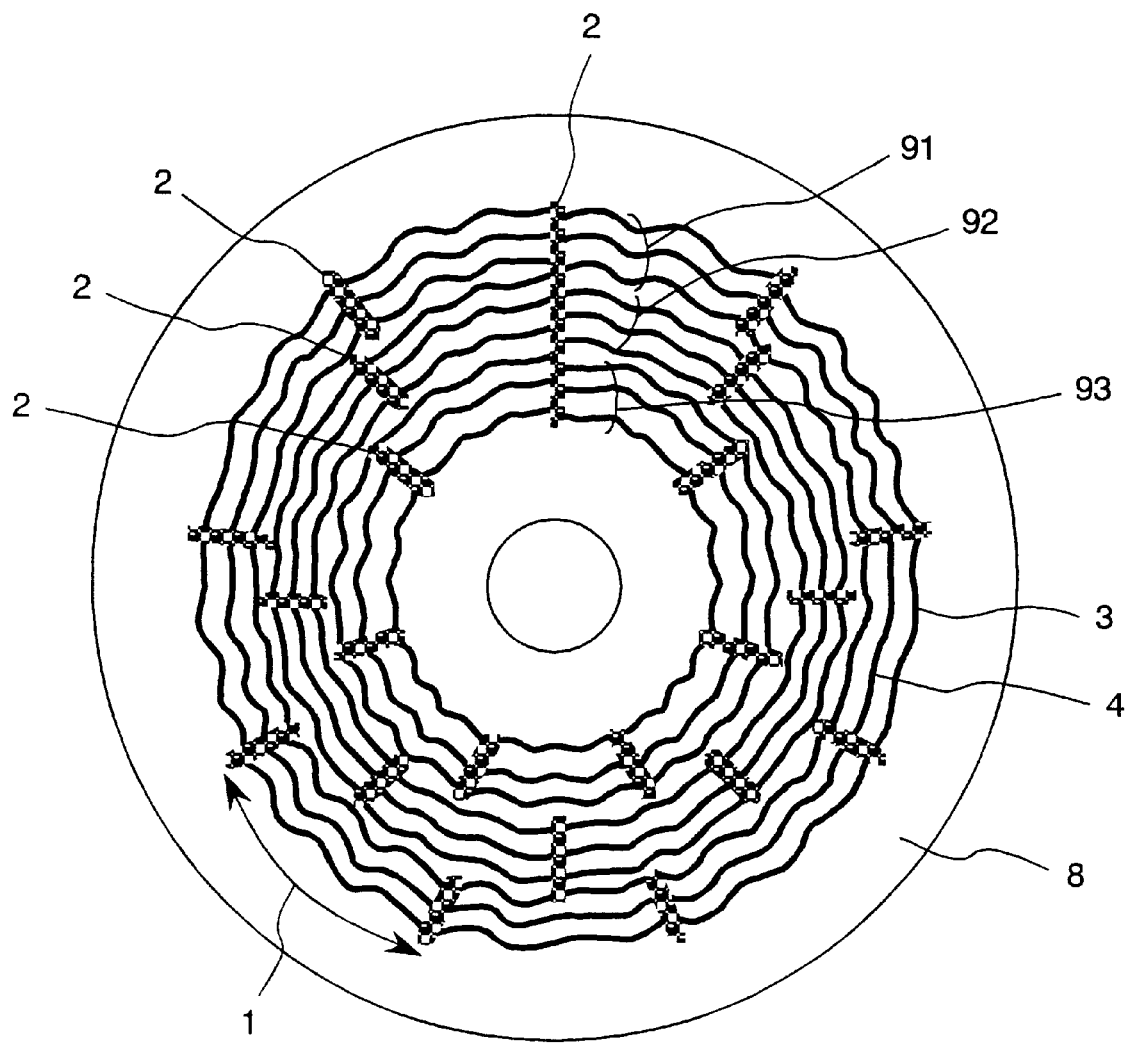
FIG. 1 is a plan view showing a layout of tracks and sectors of a recording medium provided by the present invention.

FIG. 1 is a plan view showing a layout of tracks and sectors of a recording medium provided by the present invention. In the figure, reference numeral 8 denotes the recording medium. Reference numeral 1 is a sector delimited from adjacent ones to form a recording unit. Each sector 1 comprises an identification portion 2 which serves as a delimiter of the sector 1 and a data recording area on either a groove track 3 or a land track 4. The identification portion 2 is located at the head of the sector 1. Reference numerals 91, 92 and 93 are each a group which comprises a plurality of sectors on groove and land tracks forming of arcs laid out in the radial direction of the disk-shaped recording medium 8. There are thus a plurality of groups 91, 92 and 93 laid out in the radial direction of the recording medium 8. As shown in FIG. 1, the group 91 comprises sectors of groove tracks 3 and land tracks 4 each forming an arc. The identification portions 2 on the groove and land tracks 3 and 4 at the heads of sectors 1 pertaining to the groups 91, 92 and 93 are aligned along lines in the radial direction. The groove track 3 wobbles in the radial direction. The length of a sector 1 is set at a predetermined value. The number of sectors 1 on a track circle gradually becomes greater as the radius of the track circle is increased.

Figure 2:
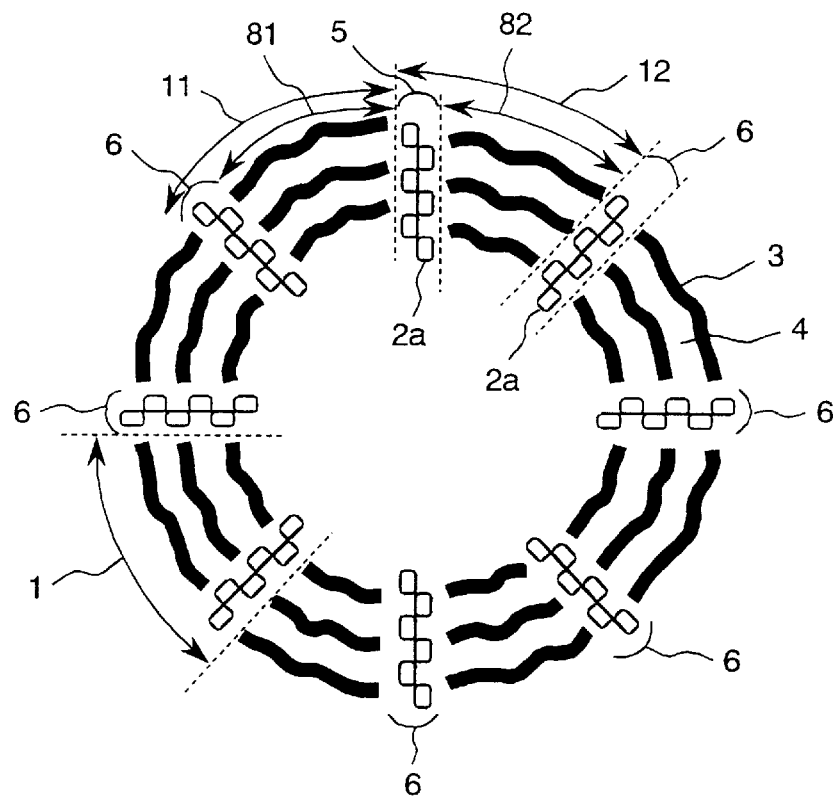
FIG. 2 is a plan view showing a detailed layout of tracks and sectors of a recording medium provided by the present invention.

FIG. 2 is a plan view showing a detailed layout of tracks and sectors of a recording medium provided by the present invention. The groove tracks 3 each having a track width of 0.7 microns and a depth of 60 nm and the land tracks 4 each having a width of 0.7 microns are laid out alternately. Sectors of a groove track 3 laid out at a radius each form a track circle. By the same token, sectors of a land track 4 laid out at a radius form a track circle. A groove track 3 on a circle and a land track 4 on an adjacent circle are connected to each other at a groove/land track switching portion 5 which is referred to hereafter simply as a switching portion 5. A plurality of switching portions 5 are aligned along a line in the radial direction. To put it in detail, at the end of a circle, a groove track 3 is connected to a land track 4 on the adjacent circle. By the same token, at the end of the adjacent circle, a land track 4 is connected to a groove track 3 on the next circle for the groove track 3. Each of the groove tracks 3 and the land tracks 4 is divided into a plurality of recording units each with a shape resembling an arc. The recording unit is shown as a sector 1. Each of the recording units 1 is provided with an identification portion 2 at the head thereof. One of the identification portions 2 is used as a switching portion 5 while the rest is non-switching portions 6. On each of the identification portions 2, identification information 2a is recorded. The length of a sector 1 is typically 8 mm, a number which corresponds to 2,048 bytes of user data. The groove tracks 3 and the land tracks 4 each wobble in the radial direction at an amplitude of about 20 nm. The period of the wobbling is 1/232 of the length of a sector 1. The wobbling period is set at a selected value equal to a multiple of channel clock periods of recorded data. Thus, a recording/playback timing generation clock signal can be generated from a wobble clock signal.

Figure 3:
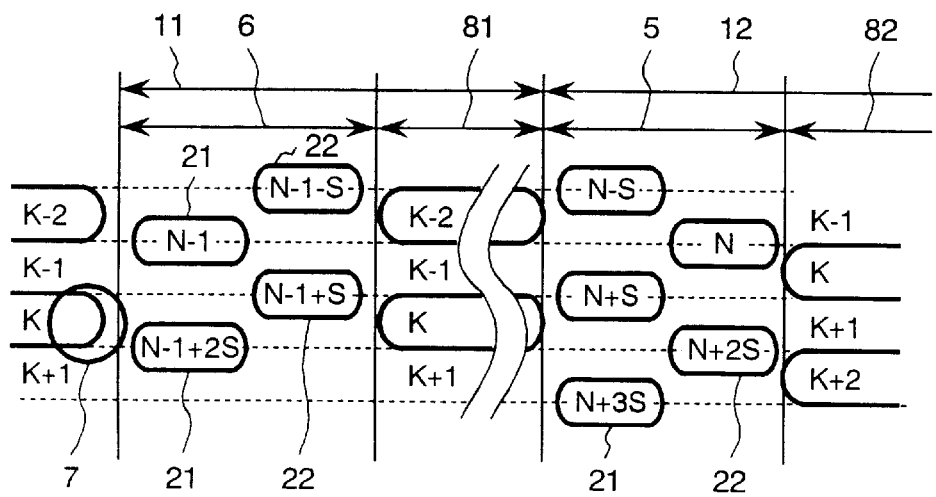
FIG. 3 is a chart showing an example of numbering of identification information on a recording medium provided by the present invention.

It should be noted that, in FIG. 2, reference numerals 11 and 12 denote sectors before and after the switching portion 5. FIG. 3 is a chart used for explaining numbering of identification information 2a. The sector 11 comprises a non-switching portion 6 and a recording area 82 which is on either a groove track 3 or a land track 4. On the other hand, the sector 12 comprises the switching portion 5 and a recording area.

FIG. 3 is a chart showing an example of numbering of identification information on a recording medium provided by the present invention.

The following is description of numbering of the identification information 2a for identifying a groove track 3 and a land track 4 by referring to this figure. The identification information 2a is denoted by numbers N−1−S, N−S, N−1, - - - , N−1+2S, N+2S and N+3S. In addition, the identification information 2a is split into first identification information 21 located on the left side of the switching portion 5 or the non-switching portion 6 shown in FIG. 3 and second identification information 22 located on the right side of the switching portion 5 or the non-switching portion 6. Reference notation K of K−2 and K−1 denotes a groove track 3 or a land track 4. In this figure, reference notations K−2 and K are each used to explain a groove track 3 while reference notations K−1 and K+1 are each used to explain a land track 4.

In addition, in this example, an operation to record or play back information is carried out by relative scanning a light spot 7 in the direction from the left to the right. The groove track K on the left side of the switching portion 5 is connected to the land track K+1 on the right side of the switching portion K+1. At the end of the circle of the land track K+1, the land track K+1 on the right side of the switching portion 5 is connected to the groove track K+2 through the switching portion 5. In this example, the first identification information 21 on the left side of the non-switching portion 6 of the groove track K is denoted by the number N−1+2S while the second identification information 22 on the right side of the non-switching portion 6 of the groove track K is denoted by the number N−1+S where notation S is the total number of optical recording information units or the number of sectors 1 per track circle. In an operation to play back the identification information 2a of the non-switching portion 6 of the groove track K by means of the light spot 7 or the like, the identification information N−1+2S is reproduced as the first identification information 21 while the identification information N−1+S is reproduced as the second identification information 22. In this case, by determining to always use a smaller number as a recording area number, the number N−1+S of the second identification information 22 is adopted to denote the identification information 2a of the groove track K. By the same token, in an operation to scan the land track K−1, the number N−1 of the first identification information 21 is this time adopted to denote the identification information 2a of the land track K−1. As a result, by adopting either the first identification information 21 or the second identification information 22, it is possible to distinguish the groove track 3 and the land track 4 from each other.

In an operation to play back information from a switching portion 5 on a groove track 3 or a land track 4, it is also possible to distinguish a groove track 3 from a land track 4 in entirely the same way. In addition, since the values of the first identification information 21 and the second identification information 22 vary from sector 1 to sector 1, the values can be used for detecting the position of a sector 1 on the recording medium 8.

Furthermore, the first identification information 21 or the second identification information 22 includes 3-bit information for indicating whether the first identification information 21 or the second identification information 22 is recorded in a switching portion 5 or a non-switching portion 6 and for indicating whether the next identification portion 2 is a switching portion 5 or a non-switching portion 6. Used for identifying a switching portion 5 or a non-switching portion 6, this 3-bit information is referred to hereafter as identification-portion identifying information.

Next, the identification information is explained in more detail to a certain degree by referring to FIG. 4.

FIG. 4A is a model diagram showing identification information in a plain and simple manner, FIG. 4B is a model diagram showing the contents of each header in the identification information and FIG. 4C is a model diagram showing the contents of physical identification information. Unlike reference numerals, reference notations such as Header 1, Header 2 and PID 1 shown in the figures are used for denoting a first header, a second header and a first PID respectively. In order to distinguish the reference notations from reference numerals, the number portion of a reference notation is enclosed in parentheses ( ) in the following description. In the figures, for example, the first identification information 21 comprises a header (1) and a header (2). On the other hand, the second identification information 22 comprises a header (3) and a header (4). As shown in FIG. 4B, a VFO (1) is located at the head of the header (1) and at the head of the header (3). On the other hand, a VFO (2) is located at the head of the header (2) and at the head of the header (4). Meaning a variable frequency oscillator, the VFO is used for synchronizing a PLL circuit of the playback system which is not shown in the figure. An AM which is included in each of the headers (1) to (4) as information common to the headers means an address mark. Data included in the first identification information and second identification information is extracted by using the AM as a base point. The headers (1) to (4) include PIDs (1) to (4) respectively. The PID means a physical identification which will be explained in more detail by referring to FIG. 4C. The headers (1) to (4) further include IEDs (1) to (4) respectively. The IED means an ID error detection, i. e., an error detection code of an ID. A PA (1) is located in the header (1) and the header (3). On the other hand, a PA (2) is located in the header (2) and the header (4). The PA means a post amble which is used for suppressing direct-current reproduction in an operation to play back data so as to make conversion of the data into a binary code easy.

As shown in FIG. 4C, the PID comprises sector information and a sector number. The sector information includes information on a reserved area or bit (Reserved), a physical ID (Physical ID Number), a sector type (Sector Type) and information on a layer (Layer Number). The physical ID number includes, among other information, a track number and a sector number. The PIDs (1) to (4) are identified by binary codes (00), (01), (10) and (11) respectively. The sector type includes the number of a sector 1 which is obtained by counting the number of sectors 1 starting from the switching portion 5. For example, a read-only sector is represented by the binary code (000) and a first RAM sector, that is, a sector including the switching portion 5, is represented by the binary code (100). A last RAM sector is represented by the binary code (101) and a second sector from the last RAM sector is represented by the binary code (110). The remaining RAM sectors are each represented by the binary code (111).

Figure 5:
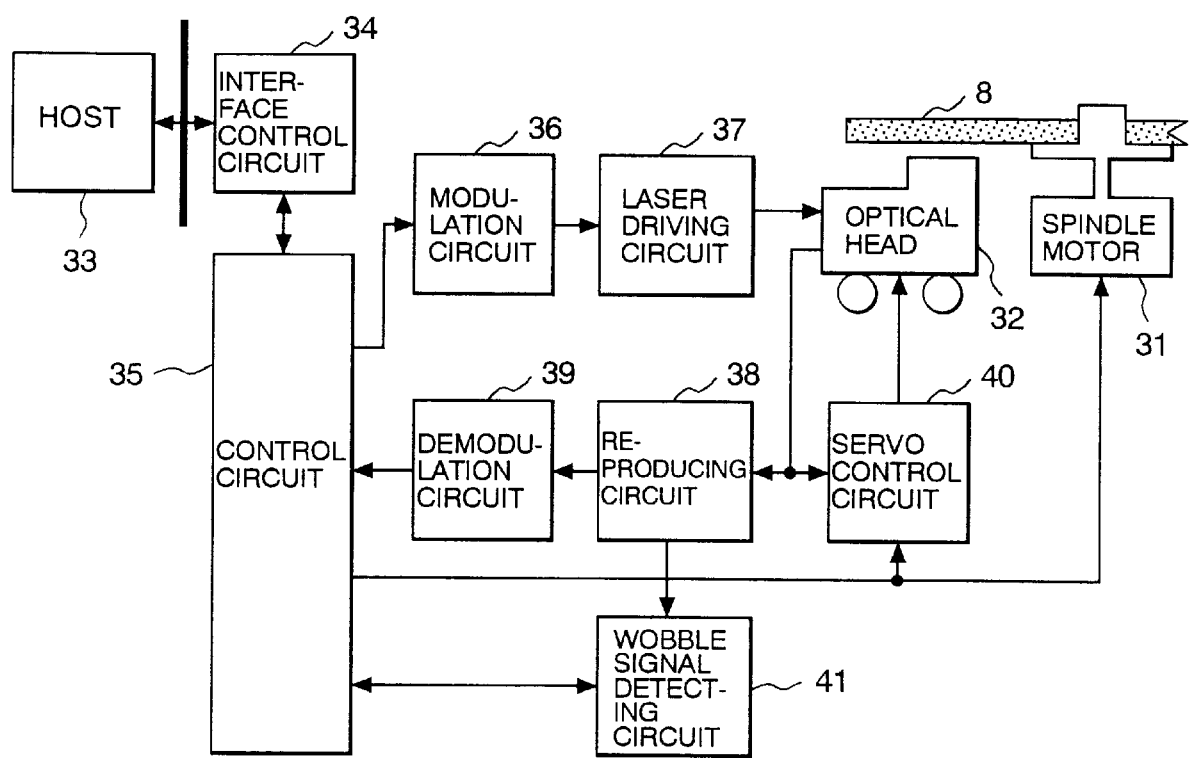
FIG. 5 is a block diagram showing an embodiment implementing an information processing apparatus provided by the present invention.

FIG. 5 is a block diagram showing an embodiment implementing an information processing apparatus provided by the present invention.

A recording medium 8 shown in the figure is driven into rotation by a spindle motor 31. A recording film used as the recording medium 8 is a phase change type recording layer made of GeSbTe. An optical head 32 comprises, among other components, a semiconductor laser for emitting a laser beam used in operations to record and play back information, an optical system for forming the light spot 7 of the order of 1 micron on the surface of the disk recording medium 8 from the laser beam emitted by the semiconductor laser and a photo detector for obtaining electrical signals necessary for operations such as the operation to reproduce information from a light reflected by the recording medium 8, automatic focusing control and tracking control. The optical head 32 is used for recording information into the recording medium 8 such as an optical disk and reproducing information from the recording medium 8. In addition, the optical head 32 is provided with a linear motor for moving the optical head 32 itself at a high speed in the radial direction of the disk and halting the optical head 32 at a location in close proximity to a specified position. It should be noted that the linear motor itself is not shown in the figure.

In the information processing apparatus, normally, an optical disk drive is connected to a host computer 33 such as a personal computer or a workstation by an interface cable conforming to SCSI (Small Computer System Interface) and ATAPI (AT Attached Packet Interface) specifications. An interface control circuit 34 employed in the optical disk drive interprets instructions and data transmitted thereto by the host computer 33 which is referred to hereafter simply as a host. The optical disk drive executes operations to record and reproducing information to and from the optical disk and a seek operation through a control circuit 35 which comprises components including a microcomputer.

First of all, the recording operation is explained. Data to be recorded in the recording medium 8 from the host 33 includes information on a recording location which is indicated by information known as an address. In conjunction with the data including the address information, a recording command is issued by the host 33. The data to be recorded is stored in a buffer memory employed in the control circuit 35. It should be noted that the buffer memory itself is not shown in the figure. Then, the data is supplied piece by piece sequentially to a modulation circuit 36. In the modulation circuit 36, the data to be recorded is converted into a train of codes corresponding to an RLL (Run Length Limited)

code such as a (1, 7) RLL code, a (2, 7) RLL code or a (2, 10) RLL code. The conversion of the data to be recorded into a train of RLL codes is further followed by conversion into a train of pulses corresponding to mark shapes to be created on the recording film. For example, in an operation to record a mark position, the train of pulses correspond to the codes "1". On the other hand, an operation to record a mark edge produces a train of pulses wherein the code "1" corresponds to a pulse edge. In this case, a 8/16 conversion code is used in the (2, 10) RLL code. To put it in detail, 8-bit information is converted into 16 bits in a write operation. In a read operation, on the contrary, code conversion of 16 bits into 8 bits is carried out. The train of pulses are supplied to a laser driving circuit 37 for turning on and off the semiconductor laser employed in the optical disk 32 in order to emit high-output light pulses. The light pulses are converged by the optical disk 32 to form an infinitesimal light spot 7 which creates a recording mark of a non-crystalline area on the recording medium 8 having a phase change type recording film.

Next, the reproducing operation is explained. In a reproducing operation, the optical head 32 is positioned at a groove track 3 or a land track 4 on the recording medium 8 at a location specified by a reproducing command issued by the host 33 in order to reproduce a signal from the groove or land tracks 3 and 4. First of all, the semiconductor laser employed in the optical head 32 is set in a low-output state to emit a DC light which is radiated to the recording film on the recording medium 8. At that time, a reflected light representing recording marks is obtained. The reflected light is received by a plurality of photo detectors separated from each other in the optical head 32. The reflected light is converted into an electrical signal in a photo-electrical conversion process. The electrical signal resulting from the photo-electrical conversion is supplied to a reproducing circuit 38. The reproducing signal reproducing data can be obtained as a total signal of signals output by the photo detectors separated from each other. Since the identification information 2a is recorded at a location between the groove track 3 and the land track 4, an identification signal, that is, a reproducing signal for the identification information 2a, can be obtained as a difference signal among the signals output by the photo detectors separated from each other. For this reason, the reproducing circuit 38 is provided with a signal switching circuit which is actuated with timing information extracted from the identification information 2a. The signal switching circuit is used to switch the signal supplied to the reproducing circuit 38 from the data signal (or the total signal) to the identification signal (or the difference signal), which are detected separately for allowing binary conversion using one slice level to be carried out, and vice versa. As a result, a sequence of signals known as a synthesis data signal is supplied to the reproducing circuit 38 which, in addition to the signal switching circuit, comprises an automatic gain control circuit for holding the amplitude of the signal at a fixed value, a waveform equalizing circuit for correcting optical spatial frequency deterioration, a binary-conversion circuit, a PLL (Phase Locked Loop) circuit and a discrimination circuit. After undergoing binary conversion in the binary conversion circuit, the synthesis data signal is discriminated by the discrimination circuit, being converted thereby into a discriminated signal. To be more specific, the synthesis data signal is converted into a signal with the phase of the binary data for adjust the phase of a reference clock signal. It should be noted that neither the binary conversion circuit nor the discrimination circuit is shown in the figure. The discriminated binary data is then supplied to a demodulation circuit 39 in which demodulation of the (1, 7) RLL code, the (2, 7) RLL code or the (2, 10) RLL code is carried out to obtain the original data. The original data resulting from the demodulation is then supplied to the control circuit 35 and transmitted to the host 33 by way of the interface control circuit 34 as a response to the reproducing command issued by the host 33.

In addition to the reproducing signal, the photo detectors employed in the optical head 32 are also capable of detecting an automatic focusing control signal used for carrying out control to focus the light spot 7 on the recording film and a tracking control signal used for carrying out control to trace a specific groove track 3 or a specific land track 4. The automatic focusing control signal and the tracking control signal for controlling the light spot are supplied to a servo control circuit 40 which comprises an error signal generating circuit, a phase compensating circuit and a driving circuit. By tracing a groove track 3 or a land track 4 by means of the optical head 32, the servo control circuit 40 carries out operations to record and reproducing information.

In addition, a wobble signal from a wobble pattern stored in each sector 1 can be detected and obtained from the difference signal among the signals output by the photo detectors separated from each other. For example, in order to obtain a wobble signal from a groove track 3, a ± first-order diffraction light is obtained from a light spot 7 radiated on the groove track 3. The ± first-order diffraction signal is detected by a photo-electrical conversion device split into a plurality of areas. A difference signal among signals output by the areas of the photo-electrical conversion device is then obtained. In this way, not only can a wobble signal be obtained from the resulting signal, but a tracking control signal can also be gained as well. The frequency of the tracking control signal varies in the range about 1 to 3 KHz. The characteristics of an object lens employed in the optical head 32 also vary in response to changes in frequency in this range. On the other hand, since the wobble signal is set at a very high frequency of typically about 157 KHz, tracking is not controlled by using the wobble signal. Thus, the tracking control is not affected by the wobble signal even if the wobble signal is mixed with the tracking control signal. The wobbling signal is obtained by passing the difference signal through a filter.

Figure 6:
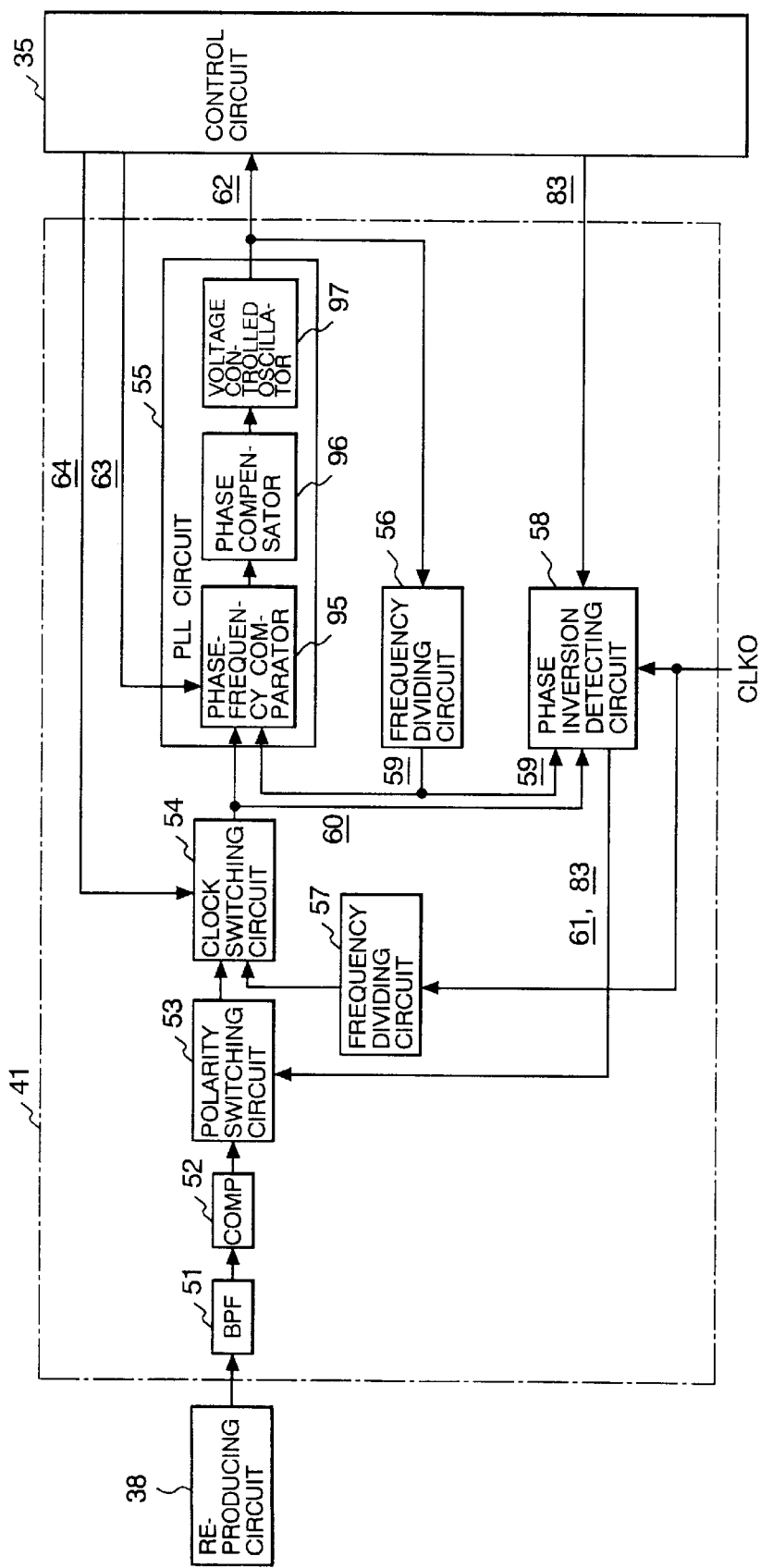
FIG. 6 is a block diagram showing an embodiment implementing a wobble signal detecting circuit provided by the present invention.

The following is description of a wobble signal detecting circuit for generating a timing generation clock signal with reference to FIG. 6.

FIG. 6 is a block diagram showing an embodiment implementing the wobble signal detecting circuit provided by the present invention. In the figure, reference numeral 41 denotes the wobble signal detecting circuit. As shown in the figure, a wobble signal fetched from the reproducing circuit 38 and an identification signal obtained from identification information 2a are supplied to the wobble signal detecting circuit 41. The identification signal includes information on a position on the recording medium 8, that is, an address in the recording medium 8, information indicating whether the track is a groove or land track and position information of a switching portion 5 or a non-switching portion 6.

The phase of the wobble signal obtained when tracing a groove track 3 is the conversion of the phase of the wobble signal obtained when tracing a land track 4. As a result, the wobble signal has the phase thereof inverted in the switching portion 5.

In the wobble signal detecting circuit shown in FIG. 6, the wobble signal and the identification signal are fetched from the reproducing circuit 38 and supplied to the wobble signal detecting circuit 41. The wobble magnitude is of the order of 20 nm, a small quantity equal to about 1/10 of the width of the track. Thus, only a band pass filter (BPF) 51 and an amplifier which is not shown in the figure are used in the detection of the wobble signal. By reducing the amount of noise and sustaining the amplitude at a fixed value, a stable wobble signal can be obtained. It should be noted, however, that in the case of a band pass filter 51 implemented by an active filter, the BPF 51 also plays the role of the amplifier. It is thus not always necessary to provide an amplifier. The analog wobble signal is converted into binary data by a comparator 52. Since the diffraction light from the light spot 7 changes in dependence on the positional relation between the light spot 7 and the groove track 3 or between the light spot 7 and the land track 4, the polarity of the wobble signal obtained when passing through the groove track 3 is the inversion of the polarity of the wobble signal obtained when passing the land track 4. For this reason, it is necessary to switch the polarity by using a polarity switching circuit 53 for each groove track or each land track. There are two means for generating timing for the switching of the polarity. According to the first means, it is possible to detect a transition from a groove track to a land track or vice versa by identifying an identification signal of the switching portion 5, which is located at one position on a track circle, in the control circuit 35. It should be noted that the identification signal is obtained from the identification information 2a recorded on the recording medium. To put it in detail, a transition from a groove track to a land track or vice versa can be detected by forming a judgment as to whether first identification information 21 or second identification information 22 is adopted from the identification signal obtained from a difference signal among signals output by the photo detectors. In this case, a polarity switching signal detected in the control circuit 35 is SL/SG (select land/select groove) which is denoted by a signal 83. When the optical head 32 starts tracing a groove track 3 or a land track 4, obtaining a normal wobble signal, and when switching timing is detected normally in the control circuit 35, the first polarity switching signal 83 is valid. The first means will be explained in detail later with reference to drawings.

The second means is explained by referring to FIG. 6. In the wobble signal detecting circuit shown in the figure, the wobble signal and the identification signal are supplied to the band pass filter 51 employed in the wobble signal detecting circuit 41. The signal output by the band pass filter 51 is an analog wobble signal which is converted by the comparator 51 into binary data by comparison with a reference signal. The binary data is then supplied to a phase-frequency comparator 95 employed in the PLL circuit 55 as a wobble signal 60 and the phase inversion detecting circuit 58 by way of a polarity switching circuit 53 and the a clock switching circuit 54. The wobble signal 60 is output as a recording/reproducing timing generation clock signal 62 by way of the phase-frequency comparator 95, a phase compensator 96 and a voltage control oscillator 97. The recording/reproducing timing generation clock signal 62 is referred to hereafter simply as a timing generation clock signal. The frequency of the wobble signal 60 is normally set at a value lower than that of the timing generation clock signal 62. In this embodiment, the frequency of the wobble signal 60 is set at a value equal to 1/186 of that of the timing generation clock signal 62. For this reason, the frequency of the timing generation clock signal 62 is divided by a frequency dividing circuit 56, the output 59 of which is fed back to the phase-frequency comparator 95 employed in the PLL circuit 55. The phase of the feedback signal 59 is compared by the phase-frequency comparator 95 with the phase of the wobble signal 60. A signal representing a result of the comparison is supplied to the voltage control oscillator 97 by way of the phase compensator 96 in order to control the voltage control oscillator 97. As a result, a timing generation clock signal 62 with a phase adjusted to the phase of the wobble signal 60 is output at an output terminal of the PLL circuit 55. The timing generation clock signal 62 is divided by the frequency dividing circuit 56 into a value equal to the frequency of the wobble signal 60. The feedback signal having the divided frequency is supplied to the PLL circuit 55 and a phase inversion detecting circuit 58. When the difference in phase between the wobble signal 60 and the feedback signal 59 exceeds a value set in advance, a second polarity switching signal 61 is generated from the phase inversion detecting circuit 58 and supplied to a polarity switching circuit 53 in order to invert the polarity of the wobble signal. In normal condition the first inversion switching signal 83 is supplied to the polarity switching circuit 53 through the EOR gate 75 in the inversion detecting circuit 58 When the bits of the identification portion are destroyed or a bit defect is detected, however, the first identification information 21 and the second identification information 22 are not generated, causing no first polarity switching signal 83 to be generated or the first polarity switching signal 83 to be generated by mistake. Such a first polarity switching signal 83 can not be used. In this case, the polarity of the wobble signal 60 is inverted by using the second polarity switching signal 61.

In addition, when the optical head 32 is started or in a seek operation, the wobble signal 60 is not generated. Thus, the timing generation clock signal 62 can not be sustained. In this case, the frequency of a reference clock signal CLK0 generated by a reference oscillator not shown in the figure is divided by a frequency dividing circuit 57 into a value equal to the frequency of the wobble signal 60. The signal output by the frequency dividing circuit 57 with the divided frequency is supplied to a clock switching circuit 54. When the optical head 32 is started or in a seek operation, the clock switching signal 64 is generated by the control circuit 35 to drive the clock switching circuit 54 to supply the reference clock signal with the divided frequency to the PLL circuit 55. Thus, also when the optical head 32 is started or in a seek operation, the PLL circuit 55 operates normally as well, generating the timing generation clock signal. In this way, during a period beginning from the start of the tracing of a track by the optical head 32 till a normal wobble signal is obtained, a reference clock signal generated by the reference crystal oscillator is supplied, allowing the PLL circuit 55 for the wobble clock signal 60 to always attain a stable operation.

The following is more detailed explanation of generation of a timing generation clock signal by means of the PLL circuit 55. With the frequency of the wobble signal to be detected set at a typical value equal to 1/186 of the frequency of the timing generation clock signal, the period of the wobble signal 60 is found too lagging at the phase-frequency comparator 95 provided at the input stage of the PLL circuit 55, resulting in a small comparison gain. Thus, there is raised a problem that the lead-in time to reach the reference frequency is too long. In addition, there is also raised a problem that the PLL with a form of carrying out a frequency lead-in operation can not be adopted because the difference in frequency between the timing generation clock signal and the wobble signal 60 is big. For these reasons, in the present embodiment, the frequency of the reference clock signal CLK0 generated by the reference crystal oscillator is divided by the frequency dividing circuit 57 and the frequency of the recording/reproducing timing generation clock signal generated by the PLL circuit 55 is divided by the frequency dividing circuit 56 and fed back to the phase-frequency comparator 95 in order to make the frequency of a signal input to the phase-frequency comparator 95 match that of the wobble signal 60. In addition, since no wobble portion is present in the identification portion 2, causing no wobble signal 60 to be generated, the PLL circuit 55 will be put in a runaway state under this condition. For this reason, a PLL holding signal 63 from the control circuit 55 is used for halting the operation of the phase-frequency comparator 95 employed in the PLL circuit 55 between identification portions 2 in order to sustain the oscillation frequency. As a result, the frequency of feedback signal 59 can be held at a value all but equal to the frequency of the input wobble signal 60 and the frequency even in the identification portion 2 can be held at a fixed value, causing the PLL circuit 55 to operate in a stable state. In an operation to reproducing information from the recording medium 8 which has been recorded thereto in a CLV (Constant Linear Velocity) or ZCLV (Zoned CLV) recording operation, the rotational speed of the spindle motor varies in a seek operation. As a result, reproducing processing can not be executed till the rotational speed reaches a specification value, giving rise to a long effective seek time in some cases. This problem can be solved by providing the PLL circuit 55 with a function similar to a wide capture reproducing adopted in a CD-ROM drive. To put it concretely, if the PLL circuit 55 is provided with a frequency lead-in function, the PLL circuit 55 operates to accomplish a reproducing operation in synchronization with the input wobbling signal 60 even if the rotational speed is shifted from a steady state.

If a PLL circuit 55 having a frequency lead-in function is used, the PLL circuit 55 will be capable of operating to accomplish a reproducing operation in synchronization with the input wobbling signal 60 even if the rotational speed is shifted from a steady state. If a PLL circuit including only a comparator is used, a frequency detecting circuit is added separately. In this case, a VCO (Voltage Control Oscillator) in the PLL circuit employed in the reproducing circuit is controlled in a direction in which the rotational speed changes till the frequencies match each other. As the frequencies match each other, the PLL circuit is locked in order to execute synchronization, allowing a similar effect to be obtained.

In another embodiment, an RD gate (READ gate) is used for selecting either a recording/reproducing signal or a reference clock signal as a signal input to the PLL circuit employed in the reproducing circuit. In this case, a signal output by the wobble signal detecting circuit 41 is input as a reference clock signal. Thus, the VCO frequency of the PLL circuit 55 can always be adjusted to match the wobble frequency so that the time it takes to adjust the rotational speed of the spindle motor 31 to a value in an allowable range can be shortened. As a result, the seek time can also be made short as well.

Figure 7A:
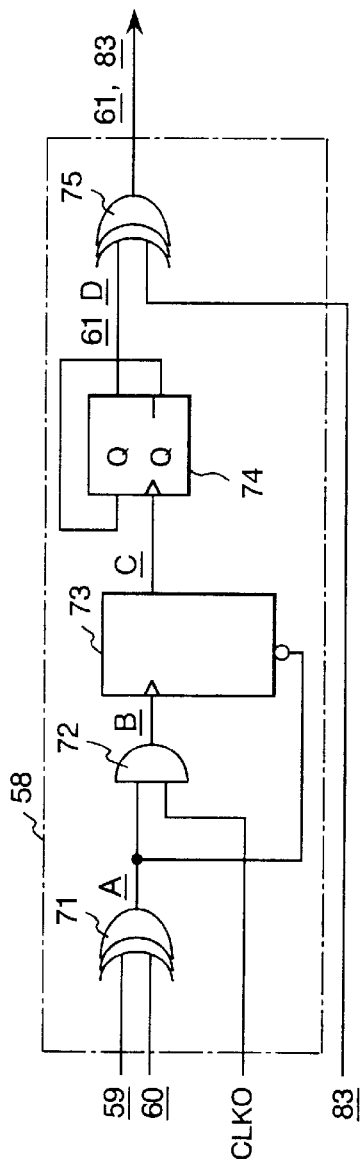
FIG. 7A is a block diagram showing an embodiment implementing a phase inversion detecting circuit employed in the wobble signal detecting circuit provided by the present invention.
Figure 7B:
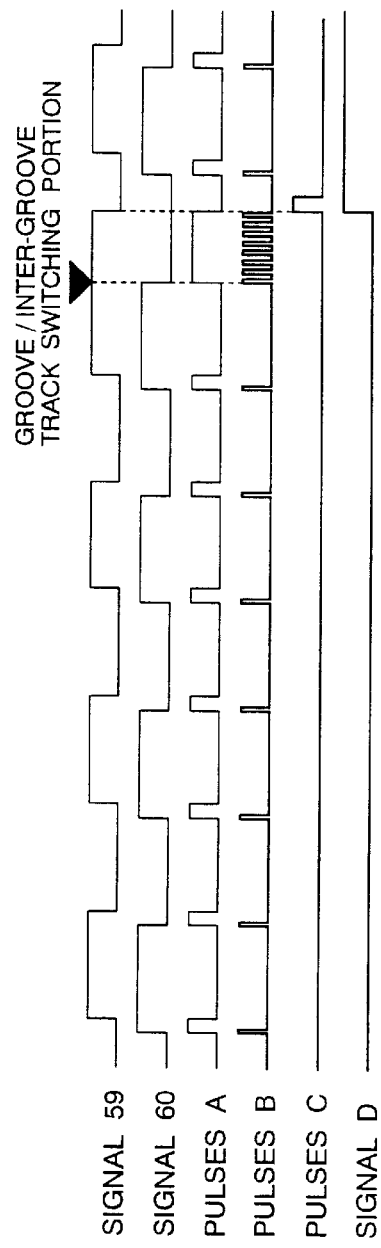
FIG. 7B shows time charts of signals used in explanation of the phase inversion detecting circuit provided by the present invention.

The circuit configuration of an actual phase inversion detecting circuit 58 is explained by referring to FIG. 7. FIG. 7A is a block diagram showing an embodiment implementing the phase inversion detecting circuit employed in the wobble signal detecting circuit provided by the present invention while FIG. 7B shows time charts of signals used in explanation of the phase inversion detecting circuit provided by the present invention. As shown in FIG. 7A, the wobble signal 60, a signal output by the clock switching circuit 54, and the feedback signal 59 resulting from division of the frequency of a signal output by the PLL circuit 55 by 186 by means of the frequency dividing circuit 56 for dividing the frequency to 1/186 are supplied to an EOR (Exclusive OR) gate 71 employed in the phase inversion detecting circuit 58. As shown in FIG. 7B, the phases of the wobble signal 60 and the feedback signal are different from each other to a certain degree. The PLL circuit 55 adjusts the frequency of the feedback signal 59 so that the phases of the wobble signal 60 and the feedback signal 59 synchronize each other. Due to a lagging response of the PLL circuit 55 and other reasons, however, the phases are different from each other to a certain degree. The difference in phase between the wobble signal 60 and the feedback signal 59 results in a signal A appearing at the output terminal of the EOR gate 71. An AND gate 72 is used for generating a pulse signal B representing a logical product of the signal A and the reference clock signal CLK0. The pulse signal B is supplied to a counter 73 at the next stage for counting the number of pulses of the signal B. The counter 73 is set so that, when the number of pulses counted thereby exceeds a typical value, for example, 64, a signal output by the counter 73 is turned on. That is to say, when the pulse count becomes equal to 64, the counter 73 sets the output signal thereof to a high level, generating a pulse signal C. On the rising edge of a pulse of the signal C, a flip-flop 74 at the next stage is inverted. A second polarity switching signal 61 is generated at the output terminal of the flip-flop 74. The second polarity switching signal 61 is output by the phase inversion detecting circuit 58 by way of an EOR gate 75 and supplied to the polarity switching circuit 53 for inverting the polarity of the wobble signal.

In this way, the polarity of the feedback signal 59 output by the clock switching circuit 54 is switched, almost nullifying the difference in phase between the feedback signal 59 and the wobble signal 60. Thus, the contents of the counter 73 are cleared by the signal A output by the EOR gate 71, terminating the counting operation of the counter 73. When the scanning operation again enters a switching portion 5 after completing a track circle, the polarity of the flip-flop 74 is inverted, switching the polarity continuously. On the other hand, a first polarity switching signal 83 obtained from the control circuit 35 as will be described later is supplied to an EOR gate 75. In actuality, the first polarity switching signal 83 is supplied to the polarity switching circuit 53 by way of this EOR gate 75. When the light spot 7 accurately traces a groove track 3 or a land track 4, the first polarity switching signal 83 switches the polarity of the wobble signal. If the bits of the identification portion 2 are destroyed or a bit defect is detected, however, the first polarity switching signal 83 is not obtained. Even in such a case, however, the second polarity signal 61 is selected from the phase inversion detecting circuit 58 so that the polarity of the wobble signal can be switched in a stable manner, allowing the PLL circuit 55 to operate in a stable state as well.

Figure 8:
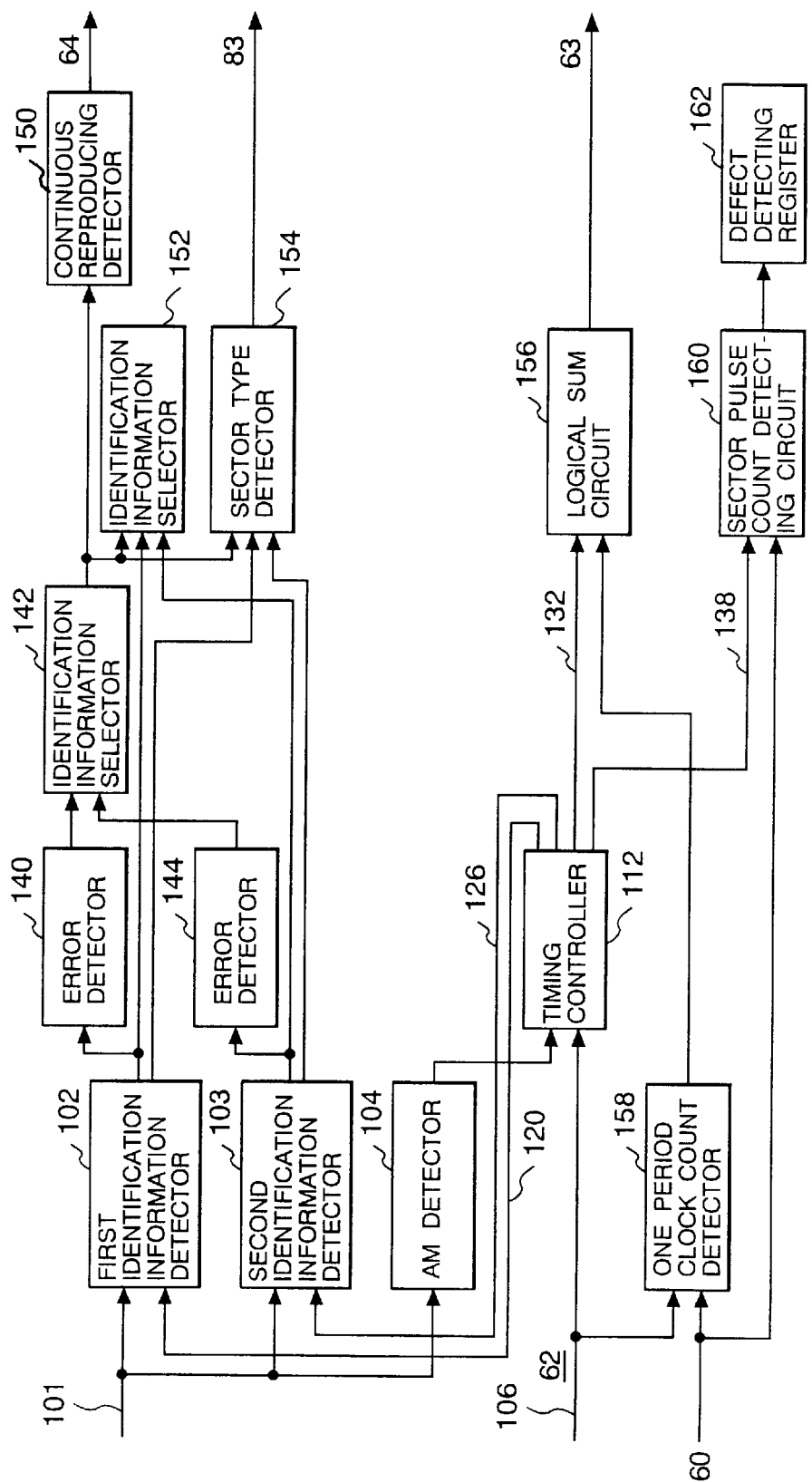
FIG. 8 is a block diagram showing an embodiment implementing a control circuit provided by the present invention.
Figure 9:
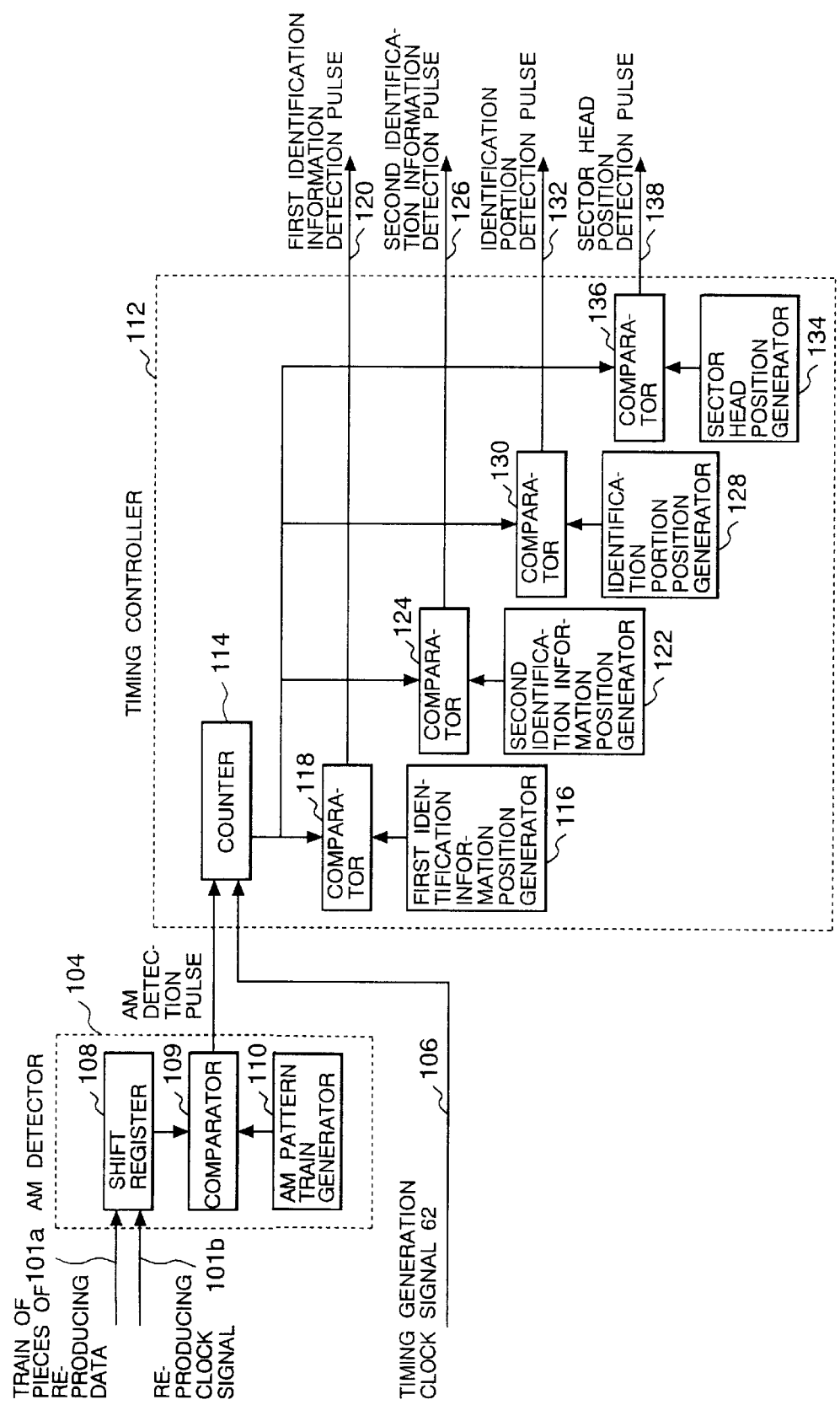
FIG. 9 is a block diagram showing an embodiment implementing an AM (Address Mark) detector and a timing controller employed in the control circuit shown in FIG. 8.

Next, the control circuit provided by the present invention is explained by referring to FIGS. 8 and 9.

FIG. 8 is a block diagram showing an embodiment implementing the control circuit provided by the present invention and FIG. 9 is a block diagram showing an embodiment implementing an AM (Address Mark) detector and a timing controller employed in the control circuit shown in FIG. 8.

A train of pieces of reproducing data and a reproducing clock signal generated by the demodulation circuit 39 shown in FIG. 5 are supplied to an input terminal 101 of the control circuit shown in FIG. 8 to be passed on to a first identification information detector 102, a second identification information detector 103 and the AM (Address Mark) detector 104. On the other hand, the timing generation clock signal 62 generated by the PLL circuit 55 shown in FIG. 6 is supplied to another input terminal 106.

First of all, the control circuit is explained by referring to FIG. 9. The input terminal 101 of the AM detector 104 shown in FIG. 8 comprises an input terminal 101a for inputting a train of pieces of reproducing data and an input terminal 101b for inputting the reproducing clock signal. The AM detector 104 comprises a shift register 108, a comparator 109 and an AM (Address Mark) pattern train generator 110. A train of patterns of address marks are unique patterns. Information other than address marks in a train of patterns is not used in the system. The train of pieces of reproducing data are supplied to a shift register 108 sequentially piece by piece with timing determined by the reproducing clock signal. If a train of patterns identical with the train of AM patterns are received, an AM detection pulse is supplied to a comparator 109. The AM detection pulse is also supplied to a counter 114 employed in a timing controller 112. In addition, the timing generation clock signal 62 generated by the PLL circuit 55 shown in FIG. 6 is also supplied to the counter 114. The counter 114 is cleared by the AM detection pulse, starting to count the number of pulses in the timing generation clock signal 62. Since the positions of first identification information, second identification information, an identification portion and the head of a sector are determined from the AM detection pulse, the operation to count the number of pulses in the timing generation clock signal 62 is started by the AM detection pulse to detect positions, the pulse counts for which are determined in advance. To put it in detail, by comparing the output of the counter 114 with the output of a first identification information position generator 116 by means of a comparator 118, a first identification information detection pulse can be output to an output terminal 120. By the same token, by comparing the output of the counter 114 with the output of a second identification information position generator 122 by means of a comparator 124, a second identification information detection pulse can be output to an output terminal 126. Furthermore, by comparing the output of the counter 114 with the output of an identification position generator 128 by means of a comparator 130, an identification header detection pulse can be output to an output terminal 132. In addition, by comparing the output of the counter 114 with the output of a sector position generator 134 by means of a comparator 136, a sector head position detection pulse can be output to an output terminal 138.

Figure 10:
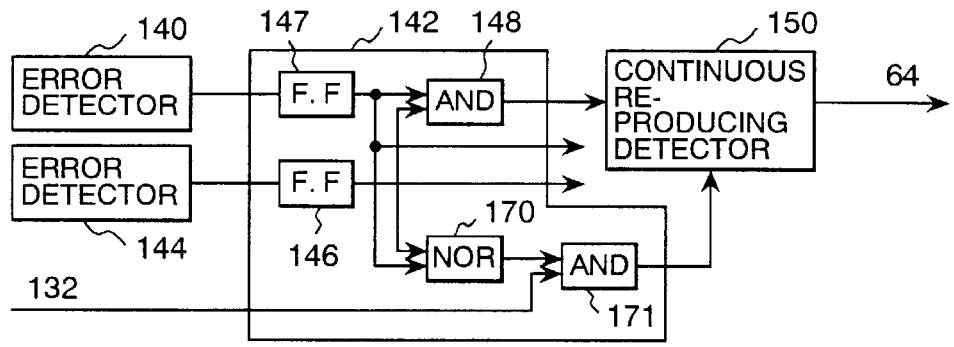
FIG. 10 is a block diagram showing an embodiment implementing an identification information selector employed in the control circuit shown in FIG. 8.

As shown in FIG. 8, the first identification information detection pulse appearing at the output terminal 120 is supplied to the first identification information detector 102. A train of pieces of reproducing data are also supplied to the first identification information detector 102. In the first identification information detector 102, first identification information 21 and an IED code are extracted from the train of pieces of reproducing data with timing determined by the first identification information detection pulse. The extracted first identification information 21 is supplied to an error detector 140 for checking whether or not an error is present therein by using the error detection code IED. A result of the error detection is supplied to an identification information selector 142. By the same token, the second identification information detection pulse appearing at the output terminal 126 is supplied to the second identification information detector 103. A train of pieces of reproducing data are also supplied to the second identification information detector 103. In the second identification information detector 103, second identification information 22 and an IED code are extracted from the train of pieces of reproducing data with timing determined by the second identification information detection pulse. The extracted second identification information 22 is supplied to an error detector 144 for checking whether or not an error is present therein by using the error detection code IED. A result of the error detection is supplied to the identification information selector 142. If an error is detected in the first identification information 21 by the error detector 140 and/or an error is detected in the second identification information 22 by the error detector 144, a pulse is generated by the error detector 140 and/or 144 respectively. If no error is detected in the first identification information 21 by the error detector 140 and no error is detected in the second identification information 22 by the error detector 144, on the other hand, no pulse is generated by either the error detector 140 or the error detector 144. As described above, the pulses generated by the error detectors 140 and 144, if any, are supplied to the identification information selector 142. FIG. 10 is a block diagram showing an embodiment implementing the identification information selector 142 employed in the control circuit shown in FIG. 8. As shown in the figure, the identification information selector 142 comprises flip-flop circuits 146 and 147 as well as an AND gate 148. The pulses generated by the error detectors 140 and 144 are supplied to the flip-flop circuits 147 and 146 respectively. Signals output by the flip-flop circuits 147 and 146 are supplied to the AND gate 148. If an error is detected in the first identification information 21 by the error detector 140 and an error is also detected in the second identification information 22 by the error detector 144, pulses generated by the error detector 140 and 144 are supplied to the flip-flop circuits 147 and 146 respectively and the signals generated by the flip-flop circuits 147 and 146 are supplied to the AND gate 148 which in turn generates a pulse. If both or either of the first identification information 21 and the second identification information 22 are correct, on the other hand, the AND gate 148 does not generate a pulse. The pulse output by the AND gate 148 is supplied to a continuous reproducing detector 150 which includes a counter as a main component. The counter is used for counting the number of pulses generated by the AND gate 148. When the pulse count becomes equal to a number determined in advance, the level of a signal output by the continuous reproducing detector 150 is raised. The signal output by the continuous reproducing detector 150 is supplied to the clock switching circuit 54 shown in FIG. 6 as a clock switching signal 64. The signals output by the flip-flop circuits 147 and 146 are supplied to a NOR gate 170. A signal output by the NOR gate 170 and an identification header detection pulse 132 output by the timing controller 112 are supplied to an AND gate 171 for generating a pulse representing the logical product of the signal output by the NOR gate 170 and the identification header detection pulse 132. The pulse output by the AND gate 171 is used for resetting the counter employed in the continuous reproducing detector 150. A pulse showing the end of the identification signal is obtained by comparing the signal output by the counter 114 shown in FIG. 9 with a signal output by an identification information end position generator not shown in the figures by means of a comparator which is also not shown in the figures.

As described above, when a wobble pattern is missed, causing no wobble signal 60 to be generated, the frequency of the timing generation clock signal 62 gets out of order. In such a state, since the counter 114 shown in FIG. 9 does not work accurately anymore, the first identification information 21 and the second identification information 22 can no longer be fetched, causing errors to be generated in the first identification information 21 and the second identification information 22. From the error information, the clock switching signal 64 is generated as described before to switch the clock switching circuit 54 shown in FIG. 6. With the clock switching circuit 54 switched, a reference clock signal generated by the external reference crystal oscillator is supplied to the PLL circuit 55, allowing the PLL circuit 55 to be prevented from entering a runaway state.

Supplied to an identification information register 152 shown in FIG. 8 are the signals output by the flip-flop circuits 146 and 147 employed in the identification information selector 142 as well as signals generated by the first and second identification information selectors 102 and 103.

The signals output by the flip-flop circuits 146 and 147 are treated as 2-bit data. When both the first identification information 21 and the second identification information 22 are correct, the 2-bit data has a value of (00). If only the first identification information 21 is erroneous, the 2-bit data has a value of (01). If only the second identification information 22 is erroneous, the 2-bit data has a value of (10). When both the first identification information 21 and the second identification information 22 are erroneous, the 2-bit data has a value of (11). The 2-bit data is supplied to the identification information register 152.

In the case of 2-bit data having a value of (00), the identification information with a smaller data-piece count is stored. For more information, refer to FIG. 3 and the explanation thereof. In the case of 2-bit data having a value of (01) or (10), the correct identification information is stored. If the identification information to be stored has a greater data-piece count, the identification information is stored by subtracting the number of sectors S from the data-piece count. In the case of 2-bit data having a value of (11), that is, if both the first identification information 21 and the second identification information 22 are erroneous, the identification information is stored by correcting it by using the previous identification information. The stored identification information indicates the position of the light spot 7 and is used for example when measuring the distance to a target of a seek operation.

Supplied to a sector type detector 154 is 3-bit sector types extracted by the first and second identification information detectors 102 and 103. Since the positions in the first identification information 21 and the second identification information 22 at which the sector types are located are known, the sector type can be detected with ease by counting the number of reproducing clock pulses by means of a counter after resetting the counter by the first and second identification information detection pulses. The sector type detector 154 outputs the sector type having no error which is selected from the sector types fetched from the first identification information 21 and the second identification information 22 by using the signals generated by the error detectors 140 and 144. In order to fetch the sector type with no error, a switch is turned off by the error signals output by the error detectors 140 and 144, cutting off a path of the sector type. In this way, the sector type with no error (a sector type of 100), that is, the first sector type, is extracted, generating the first polarity switching signal 83 at the output terminal of the sector type detector 53. By supplying the first polarity switching signal 83 to the polarity switching circuit 53, the polarity of the wobble signal can be switched. If the signals output by the error detectors 140 and 144 both indicate an error, the first polarity switching signal 83 is output by correction using information immediately before the switching portion of the sector types (101) and (110).

If such kinds of detection are all found impossible, the polarity of the wobble signal is switched by using the second polarity switching signal 61 generated by the phase inversion detecting circuit 58.

An identification header detection pulse fetched from a timing controller 126 is supplied to a logical sum circuit 156. The pulse has a value of 1 to indicate an identification portion or 0 to indicate an area other than an identification portion. Supplied to a one period clock count detector 158 are the wobble signal 60 and the timing generation clock signal 62. In the one period clock count detector 158, the period of the wobble signal 60 is measured in terms of pulses of the timing generation clock signal 62. If the number of pulses is found too great or too small, the one period clock count detector 158 outputs a wobble synchronization abnormality pulse to the logical sum circuit 156 to indicate an abnormal wobble shape. The logical sum circuit 156 computes the logical sum of the wobble synchronization abnormality pulse and the identification header detection pulse, outputting a signal representing the logical sum to the PLL circuit 55 as a PLL holding signal 63.

A sector head position pulse generated by the timing controller 112 is supplied to a sector pulse count detecting circuit 160 for generating a pulse representing the duration of the sector 1. The duration is measured in terms of pulses of wobble signal 60 which is also supplied to the sector pulse count detecting circuit 160. An incorrect pulse count indicates that the sector 1 is defective somewhere. In this case, the sector pulse count detecting circuit 160 stores a signal indicating the defect in a defect detecting register 162 which is used for detecting the defect of the sector 1. The pulse representing the duration of a sector 1 can be measured with ease by counting the number of pulses in the wobble signal 60.

Figure 11:
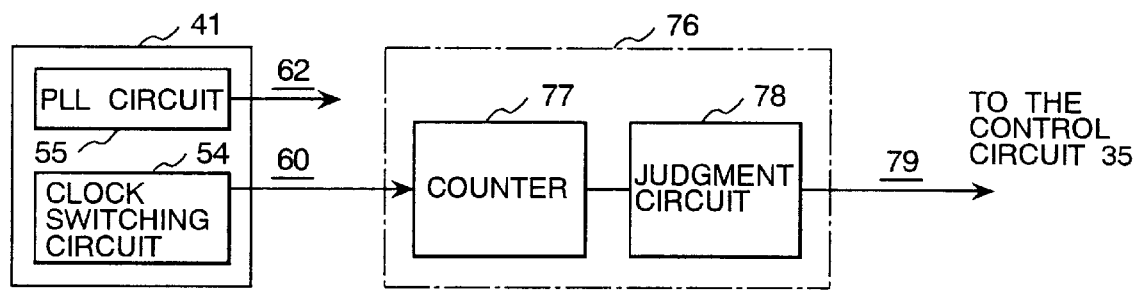
FIG. 11 is a block diagram showing an embodiment implementing a wobble abnormality detecting circuit provided by the present invention.

Next, an embodiment implementing a wobble abnormality detecting circuit is explained by referring to FIG. 11, a block diagram showing the embodiment implementing the wobble abnormality detecting circuit provided by the present invention. In the figure, reference numeral 76 denotes the wobble abnormality detecting circuit. During a recording operation, the wobble abnormality circuit 76 monitors the wobble signal, detecting an abnormality of the wobble signal caused by a defective wobble pattern or the like. In the event of a detected abnormality, the same data is recorded again in order to maintain high recording reliability. The wobble signal 60 generated by the clock switching circuit 54 employed in the wobble signal detecting circuit 41 is supplied to a counter 77 employed in the wobble abnormality detecting circuit 76. The counter 77 is used for counting the number of wobble signals existing in one sector 1, a smallest recording unit. The number of wobble signals is then supplied to a judgment circuit 78. If the number of wobble signals is found greater than a predetermined criterion value or found insufficient, the judgment circuit 78 outputs a judgment signal 79 to a register employed in the control circuit 35 in order to set an error bit therein. It should be noted that the register itself is not shown in the figures. If the number of cases in which the number of wobble signals exceeds the predetermined criterion value is found considerably great, a defect may be considered to be caused by the abnormality of wobble pattern on the disc. On the other hand, a case in which the number of wobble signals is found insufficient can be considered to be caused by a missing wobble pattern. If the case goes beyond the correction power based on the ECC (Error Correction Code) of the apparatus, the error bit is set. In this case, abnormal recording is recognized and data being recorded is written again in the sector judged to be abnormal or another sector. In other words, a recording operation is carried out by monitoring the error bit. If the error bit is found set, the data is recorded again.

Figure 12:
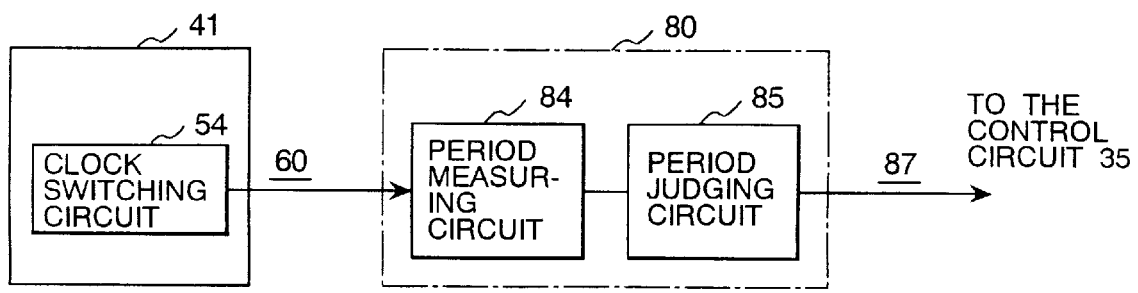
FIG. 12 is a block diagram showing another embodiment implementing the wobble abnormality detecting circuit provided by the present invention.

FIG. 12 is a block diagram showing another embodiment implementing the wobble abnormality detecting circuit provided by the present invention. In the figure, reference numeral 80 denotes the wobble abnormality detecting circuit. As shown in the figure, the wobble abnormality detecting circuit 80 comprises a period measuring circuit 84 and a period judging circuit 85. The wobble signal 60 is supplied to the period measuring circuit 84 for measuring the period of the wobble signal 60. A signal output by the period measuring circuit 84 to represent the period of the wobble signal 60 is supplied to the period judging circuit 85 at the next stage. If the period is found smaller than a predetermined criterion value or exceeds the criterion value, the period judging circuit 85 outputs a judgment signal 87 to the register employed in the control circuit 35 to set the error bit. In a recording operation, the control circuit 35 carries out recording processing while monitoring the error bit. If the error bit is found set, the control circuit 35 recognizes abnormal recording. In this case, data being recorded is written again into a sector judged to be abnormal or a block comprising a plurality of sectors which are each used for storing a recorded information unit. In this way, high recording reliability can be maintained.

As described above, by using the wobble signal detecting circuit and the wobble abnormality detecting circuit provided by the present invention, the timing generation clock signal can be generated in a stable manner. As a result, effects of a defect can be eliminated, allowing recording and reproducing operations to be carried out with a high degree of reliability. In addition, according to the present invention, it is possible to form a judgment as to whether the state of a recording operation is good or bad by using the wobble signal. Thus, it is possible to process information with a higher degree of stability as well as a higher degree of reliability and at a higher density.

What is claimed is:

1. A wobble signal detecting circuit comprising a waveform shaping circuit and a PLL circuit wherein a wobble signal is read out from a recording medium having groove tracks and land tracks laid out alternately, said groove tracks and said land tracks being formed such that said groove tracks and said land tracks wobble in a direction of a width thereof for generating said wobble signal in accordance with a wobbling share of said groove tracks and said land tracks, said wobble signal undergoes a waveform shaping process in said waveform shaping circuit and said wobble signal completing said waveform shaping process is supplied to said PLL circuit for generating a clock signal synchronized with said wobble signal completing said waveform shaping process.

2. A wobble signal detecting circuit comprising:
a waveform shaping circuit for shaping the waveform of a wobble signal;
a polarity switching circuit for switching the polarity of said wobble signal;
a PLL circuit for receiving said wobble signal output by said polarity switching circuit and for outputting a clock signal synchronized with said wobble signal; and
a phase inversion detecting circuit which is used for receiving said wobble signal and said clock signal output by said PLL circuit as a feedback signal and used for generating a polarity switching signal if a difference in phase between said wobble signal and said feedback signal is found greater than a phase difference determined in advance,
wherein said polarity switching signal is supplied to said polarity switching circuit in order to switch the polarity of said wobble signal supplied to said polarity switching circuit.

3. A wobble signal detecting circuit according to claim 2 wherein said waveform shaping circuit is implemented by a comparator for converting said wobble signal into binary data before being supplied to said polarity switching circuit.

4. A wobble signal detecting circuit according to claim 2 further having a frequency dividing circuit for dividing the frequency of said clock signal output by said PLL circuit into a value about equal to the frequency of said wobble signal wherein a signal output by said frequency dividing circuit is supplied to said PLL circuit.

5. A wobble signal detecting circuit according to claim 4 wherein said wobble signal output by said polarity switching circuit and said signal output by said frequency dividing circuit are supplied to said phase inversion detecting circuit.

6. A wobble signal detecting circuit according to claim 2 wherein said PLL circuit comprises a phase comparator and a voltage control oscillator.

7. A wobble signal detecting circuit according to claim 2 wherein said phase inversion detecting circuit comprises:
an EOR (Exclusive OR) gate for receiving said wobble signal and said
feedback signal and for outputting a pulse representing a difference in phase between said wobble signal and said feedback signal;
a counter which is used for counting the number of pulses to produce a pulse count indicating the width of said pulse output by said EOR gate and for outputting a signal when said pulse count exceeds a value determined in advance; and
a signal generating circuit which is used for generating said polarity switching signal when said counter outputs said signal.

8. A wobble signal detecting circuit according to claim 7 wherein said signal generating circuit is implemented by a flip-flop.

9. A wobble signal detecting circuit for detecting a wobble signal obtained from a recording medium which comprises groove tracks and land tracks laid out alternately, and said groove tracks and said land tracks being wobbled in a direction of a width thereof, and a switching portion for connecting each of said groove tracks to one of said land tracks following said groove track with said switching portion used for recording said identification information, wherein said switching portion is not used for recording said identification information, said wobble signal detecting circuit comprising:
an identification information detector for detecting an identification signal reproduced from said wobble portion; and
a detector which is used for detecting a signal generated by said identification information detector to indicate said switching portion and for outputting a polarity switching signal when said signal generated by said identification information detector is detected.

10. A wobble signal detecting circuit comprising:
an address mark detector for detecting an address mark;
a timing controller for generating an identification information detection pulse by using a signal output by said address mark detector;

an identification information detector for detecting identification information by using said identification information detection pulse generated by said timing controller; and a sector type detector for detecting said identification information detected by said identification information detector and for outputting a signal indicating a switching portion from sector type information, wherein said signal output by said sector type detector is used as a polarity switching signal for switching the polarity of a wobble signal obtained in accordance with a share of a wobble from a recording medium which comprises groove tracks and land tracks laid out alternately, said groove tracks and said land tracks wobbled in a direction of a width thereof, said switching portion for connecting each of said groove tracks to one of said land tracks following said groove track with said switching portion used for recording said identification information including said address mark for extracting said identification information and said sector type information for indicating said switching portion.

11. A wobble signal detecting circuit comprising:

an address mark detector for detecting an address mark;

a timing controller for generating an identification information detection pulse by using a signal output by said address mark detector;

an identification information detector for detecting identification information by using said identification information detection pulse generated by said timing controller; and a sector type detector for detecting said identification information detected by said identification information detector and for outputting a signal indicating a switching portion from sector type information, wherein said signal output by said sector type detector is used as a polarity switching signal for switching the polarity of a wobble signal obtained from a recording medium which comprises groove tracks and land tracks laid out alternately, and said groove tracks and said land tracks wobbled in the direction of width thereof, and said switching portion for connecting each of said groove tracks to one of said land tracks following said groove track with said switching portion used for recording said identification information including said address mark for extracting said identification information and said sector type information for indicating said switching portion, wherein said identification information recorded in said switching portion of said recording medium includes first identification information and second identification information which each have an address mark and a sector type and, in order to obtain said polarity switching signal for switching the polarity of said wobble signal obtained from said recording medium at said switching portion, said identification information detector comprises a first identification information detector and a second identification information detector.

12. A wobble signal detecting circuit according to claim 11 further comprising an error detector wherein signals output by said first identification information detector and said second identification information detector are both supplied to said error detector, said selector type detector outputs said polarity switching signal from either said first identification information or said second identification information with no error and, when both said first identification information and said second identification information do not have an error, said sector type detector outputs said polarity switching signal from either said first identification information or said second identification information which satisfies a predetermined condition.

13. A wobble signal detecting circuit comprising:

a clock switching circuit supplied with a wobble signal and a clock signal with a frequency equal to a fraction of the frequency of a reference clock signal;

a PLL circuit supplied with a signal output by said clock switching circuit; and a clock switching signal generator for detecting an abnormality in said wobble signal and for generating a clock switching signal in the event of an abnormality detected in said wobble signal, wherein, when said wobble signal can not be detected normally, said clock switching signal output by said clock switching signal generator is supplied to said clock switching circuit in order to switch said clock switching circuit so as to let said PLL circuit select said clock signal with a frequency equal to a fraction of the frequency of said reference clock signal.

14. A wobble signal detecting circuit according to claim 13 wherein said clock switching signal generator comprises an identification information detector for detecting identification information recorded in a recording medium and an error detector for detecting an error in said identification information.

15. A wobble signal detecting circuit according to claim 14 wherein said clock switching signal generator further has a continuous reproducing detector which is used for outputting a signal when said error detector outputs a signal continuously.

16. A wobble signal detecting circuit comprising:

a PLL circuit for inputting a wobble signal and for outputting a recording/reproducing timing generation clock signal; and a PLL holding signal generator for detecting the position of any of identification portions of a recording medium from identification information recorded in said identification header and for generating a PLL holding signal, wherein, by supplying said PLL holding signal to said PLL circuit, oscillation of an oscillator composing said PLL circuit can be sustained during said identification portion.

17. A wobble signal detecting circuit according to claim 16 wherein said PLL holding signal generator comprises an address mark detector for detecting an address mark included in said identification information recorded in each of said identification portions of said recording medium and a timing controller for outputting an identification header detection pulse from a signal output by said address mark detector.

18. A wobble signal detecting circuit according to claim 17 wherein said PLL holding signal generator further has a measuring apparatus which is used for measuring the period of said wobble signal by using said recording/reproducing timing generation clock signal output by said PLL circuit and for outputting a wobble abnormality signal when a measured value of said period is not equal to a value determined in advance.

19. A wobble signal detecting circuit according to claim 18 wherein said PLL holding signal generator further has a logical sum circuit for computing the logical sum of said measured value output by said measuring apparatus and said identification header detection pulse output by said timing controller.

20. An information processing apparatus comprising an identification information detector for detecting identification information recorded in an identification portion of a recording medium, an error detector for detecting an error in said identification information output by said identification information detector and an identification information register for storing a signal output by said error detector,
wherein said recording medium comprises groove tracks and land tracks wobbled in a direction of a width thereof, and said groove and land tracks are divided by sectors used as a recording unit and having an arcuate shape, and a portion of each sector having said identification portion being without a shape of wobbling.

21. An information processing apparatus according to claim 20 wherein said identification information comprises first identification information and second identification information, said identification information detector comprises a first identification information detector and a second identification information detector, and said error detector comprises a first error detector and a second error detector.

22. An information processing apparatus according to claim 21 further provided with an identification information selector for inputting signals output by said first error detector and said second error detector, for determining whether or not an error exists in said first identification information and/or said second identification information and for outputting said first identification information and/or said second identification information with no error.

23. An information processing apparatus according to claim 22 wherein said identification information selector comprises a first flip-flop and a second flip-flop.

24. An information processing apparatus wherein, in order to detect a defect of a sector on a recording medium comprising groove tracks-and land tracks laid out alternately and formed so as wobble in a direction of a width thereof and each divided into arc-shaped sectors each used as a recording unit, a wobble portion between each of said groove tracks and each of said land tracks adjacent to-each other and identification portions each located at the head of each of said sectors with identification information and no wobble signal recorded therein with one of said identification portions in a circle of each of said groove tracks and said land tracks used as a switching portion for connecting each of said groove tracks to one of said land tracks following said groove track, said information processing apparatus is provided with:
a timing controller for generating a sector head position detection pulse for indicating the position of the head of any of said sectors of said recording medium;
a sector length detector which is used for measuring the length of any of said sectors by using said sector head position detection pulse output by said timing detector and used for outputting a signal in case said sector length is found different from a value determined in advance; and
a register for storing said signal output by said sector length detector.

25. An information processing apparatus according to claim 24 wherein said sector length detector is implemented by a sector pulse detector for measuring said sector length in terms of pulses of said wobble signal.

26. An information processing apparatus comprising:
a waveform shaping circuit for shaping the waveform of a wobble signal;
a polarity switching circuit for switching the polarity of said wobble signal;
a PLL circuit for receiving said wobble signal output by said polarity switching circuit and for outputting a clock signal synchronized with said wobble signal;
a phase inversion detecting circuit which is used for receiving said wobble signal and said clock signal output by said PLL circuit as a feedback signal and used for generating a polarity switching signal if a difference in phase between said wobble signal and said feedback signal is found greater than a phase difference determined in advance,
an address mark detector for detecting an address mark;
a timing controller for generating an identification information detection pulse by using a signal output by said address mark detector;
an identification information detector for detecting identification information by using said identification information detection pulse generated by said timing controller; and
a sector type detector for detecting said identification information detected by said identification information detector and for outputting a signal indicating said switching portion from sector type information,
wherein said polarity switching signal output by said inversion detecting circuit and said signal output by said sector type detector are supplied to said polarity switching circuit in order to switch the polarity of said wobble signal obtained from a recording medium which comprises groove tracks and land tracks laid out alternately, a wobble portion between each of said groove tracks and each of said land tracks adjacent to each other and a switching portion for connecting each of said groove tracks to one of said land tracks following said groove track, wherein said switching portion is used for recording said identification information including said address mark for extracting said identification information and said sector type information for indicating said switching portion.

27. An information processing apparatus wherein, in order to obtain a recording/playback timing generation clock signal from a wobble signal read out from a sector of a recording medium comprising groove tracks and land tracks laid out alternately and each divided into arc-shaped sectors each used as a recording unit, a wobble portion between each of said groove tracks and each of said land tracks adjacent to each other and identification portions each located at the head of each of said sectors with identification information and no wobble signal recorded therein with one of said identification portions in a circle of each of said groove tracks and said land tracks used as a switching portion for connecting each of said groove tracks to one of said land tracks following said groove track, said information processing apparatus including:
a clock switching circuit supplied with said wobble signal and a clock signal with a frequency equal to a fraction of the frequency of a reference clock signal;
a PLL circuit supplied with a signal output by said clock switching circuit;
an identification information detector for detecting said identification information;
an error detector for detecting an error in said identification information output by said identification information detector; and
a continuous playback detector which is used for generating a signal in case said error detector outputs a signal continuously, whereby, when said wobble signal can not be detected normally, said signal output by said continuous playback detector is supplied to said clock switching circuit in order to switch said clock switching circuit so as to let said PLL circuit select said clock signal with a frequency equal to a fraction of the frequency of a reference clock signal.

28. An information processing apparatus wherein, in order to obtain a recording/playback timing generation clock signal from a wobble signal read out from a sector of a recording medium comprising groove tracks and land tracks laid out alternately and each divided into arc-shaped sectors each used as a recording unit, a wobble portion between each of said groove tracks and each of said land tracks adjacent to each other and identification portions each located at the head of each of said sectors with identification information and no wobble signal recorded therein with one of said identification portions in a circle of each of said groove tracks and said land tracks used as a switching portion for connecting each of said groove tracks to one of said land tracks following said groove track, said information processing apparatus including:

a PLL circuit for receiving said wobble signal and for generating a recording/playback timing generation clock signal;

an address mark detector for detecting an address mark included in said identification information recorded in any of said identification portions of said recording medium;

a timing controller for outputting an identification information detection pulse from a signal generated by said address mark detector;

an identification information detector for detecting said identification information by using said identification information detection pulse output by said timing controller; and a sector type detector for detecting a sector type from said identification information output by said identification information detector and for generating a signal indicating a switching portion from said sector type, whereby, by supplying said signal output by said sector type detector to said PLL circuit as a PLL holding signal, oscillation of an oscillator composing said PLL circuit can be sustained during said identification portion.

29. An information processing apparatus according to claim 28, wherein said groove tracks and said land tracks of said recording medium are formed so as to wobble in a direction of a width thereof.

30. A wobble abnormality detecting circuit comprising:
a wobble signal measuring apparatus for measuring a wobble signal supplied thereto; and
a judgment apparatus for evaluating a result of measurement output by said wobble signal measuring apparatus,
wherein said judgment apparatus outputs a signal in case said wobble signal is found abnormal, said wobble signal being generated in accordance with a shape of wobbling of groove tracks and land tracks provided on a recording medium said groove tracks and said land tracks being laid out alternately, and formed so as to wobble in a direction of a width thereof.

31. An information processing apparatus comprising:
a wobble signal measuring apparatus for measuring a wobble signal supplied thereto;
a judgment circuit for evaluating a result of measurement output by said wobble signal measuring apparatus; and
a means which is used for again recording data being recorded into a sector or a block used as a recorded information unit which is determined to be abnormal as a result of a judgment formed by said judgment circuit.

32. An information processing apparatus according to claim 31 wherein said wobble signal measuring apparatus is implemented by a counter for counting the number of wobbles in said wobble signal obtained from a sector, a smallest recording unit on a recording medium, and said judgment circuit determines that said wobble signal is abnormal when the number of pulses measured by said counter does not match a criterion value determined in advance.

33. An information processing apparatus according to claim 31 wherein said wobble signal measuring apparatus is implemented by a period measuring circuit for measuring the period of said wobble signal and said judgment circuit determines that said wobble signal is abnormal when a measurement value produced by said period measuring circuit does not match a criterion value determined in advance.

34. An information processing method using:
a waveform shaping circuit for shaping the waveform of a wobble signal;
a polarity switching circuit for switching the polarity of said wobble signal; and
a PLL circuit for receiving said wobble signal output by said polarity switching circuit and for outputting a clock signal synchronized with said wobble signal;
whereby, when a difference in phase between said wobble signal and a feedback signal exceeds a phase difference determined in advance, a polarity switching signal is generated for switching the polarity of said wobble signal obtained from a recording medium which comprises groove tracks and land tracks laid out alternately, a wobble portion between each of said groove tracks and each of said land tracks adjacent to each other and a switching portion for connecting each of said groove tracks to one of said land tracks following said groove track with said switching portion used for recording identification information including an address mark for extracting said identification information and sector type information for indicating said switching portion.

35. An information processing method whereby, in order to generate a signal for switching the polarity of a wobble signal obtained from a recording medium which comprises groove tracks and land tracks laid out alternately, said groove tracks and said land tracks being wobbled in a direction of a width thereof for generating said wobble signal in accordance with a shape of a wobbling, and a switching portion for connecting each of said groove tracks to one of said land tracks following said groove track with said switching portion used for recording an address mark, and identification information including sector type information, said method is designed to comprise the steps of:

detecting said address mark;
generating an identification-information detection pulse by using said address mark;
detecting said identification information by using said identification information detection pulse; detecting a sector type from said identification information;
outputting a signal indicating said switching portion from said sector type; and
using said signal indicating said switching portion to switch the polarity of said wobble signal.

* * * * *